(12) United States Patent
Wang

(10) Patent No.: US 8,025,344 B1
(45) Date of Patent: Sep. 27, 2011

(54) SPOKE FASTENING DEVICE FOR VEHICLE WHEEL

(76) Inventor: Yu Ju Wang, Taipei (TW)

( * ) Notice: Subject to any disclaimer, the term of this patent is extended or adjusted under 35 U.S.C. 154(b) by 0 days.

(21) Appl. No.: 12/799,307

(22) Filed: Apr. 22, 2010

(51) Int. Cl.
*B60B 21/06* (2006.01)

(52) U.S. Cl. ...................................... 301/58; 301/95.106

(58) Field of Classification Search .................... 301/58, 301/95.104, 95.106, 104; 29/512, 894.33, 29/894.333; 411/58, 60.1, 61, 70, 75, 501; 16/2.1, 109
See application file for complete search history.

(56) References Cited

U.S. PATENT DOCUMENTS

| | | | | |
|---|---|---|---|---|
| 308,794 A | * | 12/1884 | Pratt | 301/95.105 |
| 2,104,217 A | * | 1/1938 | Barnes | 292/356 |
| 3,421,404 A | * | 1/1969 | Jacobs | 411/55 |
| 4,675,937 A | * | 6/1987 | Mitomi | 16/2.1 |
| 4,904,135 A | * | 2/1990 | Barthomeuf et al. | 411/55 |
| 5,765,979 A | * | 6/1998 | Mader et al. | 411/61 |
| 5,807,049 A | * | 9/1998 | Beck et al. | 411/31 |
| 6,811,228 B2 | * | 11/2004 | Tien | 301/58 |
| 6,822,165 B2 | * | 11/2004 | Nishimoto | 174/650 |
| 6,938,962 B1 | | 9/2005 | Schlanger | |
| 7,434,891 B2 | | 10/2008 | Tien | |
| 2004/0026986 A1 | * | 2/2004 | Jager | 301/58 |
| 2008/0048489 A1 | | 2/2008 | Liu | |
| 2008/0290721 A1 | * | 11/2008 | Wang | 301/58 |

* cited by examiner

*Primary Examiner* — Russell Stormer
(74) *Attorney, Agent, or Firm* — Charles E. Baxley

(57) ABSTRACT

A spoke fastening device includes a spoke fastening hole drilled through a spoke bed of a wheel rim for receiving a head and a stem of a nipple and a collar of a ferrule, the collar includes an inner peripheral wall and an outer peripheral wall each having a lower portion for engaging into the spoke fastening hole of the spoke bed, the inner peripheral wall includes an outwardly curved rim for engaging with the spoke bed of the wheel rim, and the outer peripheral wall of the collar includes another outwardly curved rim for engaging with the curved rim of the inner peripheral wall, the head of the nipple flares and deforms the lower portions of the peripheral walls to engage with the spoke bed of the wheel rim.

6 Claims, 9 Drawing Sheets

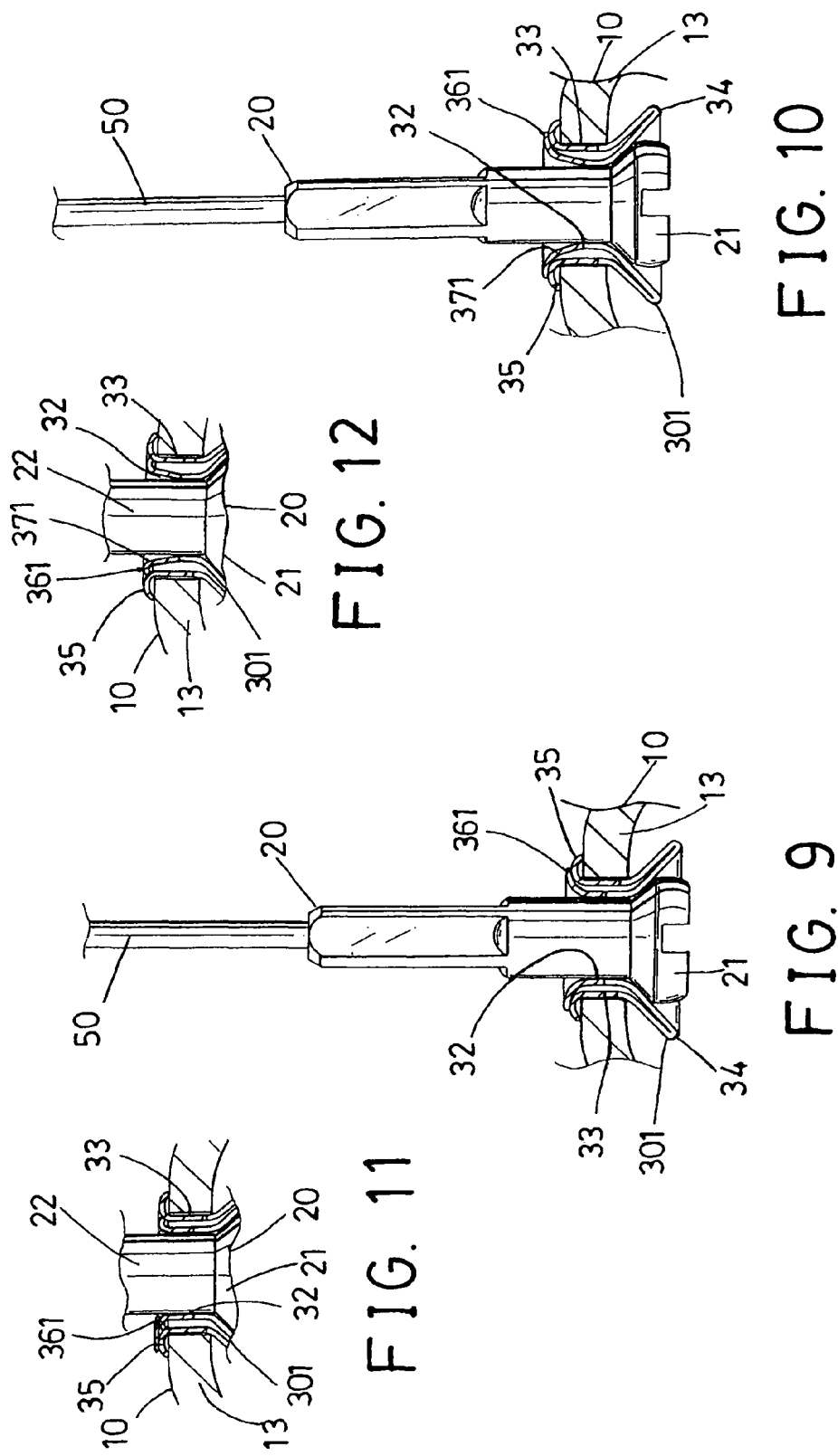

SPOKE FASTENING DEVICE FOR VEHICLE WHEEL

BACKGROUND OF THE INVENTION

1. Field of the Invention

The present invention relates to a spoke fastening device for a vehicle wheel, such as a wheel for a bicycle, unicycle, tricycle, motorcycle or the like, and more particularly to a spoke fastening device including a structure for being easily installed to or disengaged from the vehicle wheel, and including a weight reduced structure.

2. Description of the Prior Art

Typical spoke fastening devices for mounting a spoke on a wheel rim comprise a spoke fastener including a shank having an anchoring portion and an operating portion, the anchoring portion is formed with resilient arm segments that are angularly spaced apart from each other and forcible radially and inwardly toward a central shank axis for allowing the anchoring portion to engage through a spoke fastening hole in a wheel rim.

For example, U.S. Pat. No. 6,938,962 to Schlanger discloses one of the typical spoke fasteners or vehicle wheel spoke coupling devices or terminations comprising a number of hub flanges or ferrules and connecting elements for coupling or fastening or securing the spokes to the wheel rim, and the hub flanges or ferrules each include a cylindrical collar for engaging through the spoke fastening holes in the wheel rim and for being flared or deformed to create the flared portion and to engage with the wheel rim.

However, the hub flanges or ferrules should be made of deformable metal materials such that the flared portion of the cylindrical collar the hub flanges or ferrules should also be made of deformable metal materials, which will then be engaged with the wheel rim that is also made of metal materials, it will be difficult to form a water tight seal structure between the metal hub flanges or ferrules and the metal wheel rim. In addition, the hub flanges or ferrules include a cylindrical shape that may not be engaged with or rotated or driven by the driving tools.

U.S. Pat. No. 7,434,891 to Tien discloses another typical wheel having a spoke solidly coupling device or spoke positioning pocket and comprising a number of couplers and fasteners and lock nuts for coupling or fastening or securing the spokes to the wheel rim, and the couplers each also include a number of slots for forming a number of spring blades and for allowing the spring blades to be engaged through the spoke fastening holes in the wheel rim.

However, similarly, for allowing the spring blades of the couplers to engage through the spoke fastening holes in the wheel rim, the couplers should also include a relatively smaller outer diameter than an inner diameter of the spoke fastening hole in the wheel rim, such that the couplers may not be solidly secured to the wheel rim, or it will be difficult to form a water tight seal structure between the couplers and the wheel rim. In addition, the couplers include a cylindrical shape that may not be engaged with or rotated or driven by the driving tools.

U.S. Patent Application Publication No. US 2008/0048489 to Liu discloses a further typical vehicle wheel spoke coupling device or bicycle wheel rim assembling structure comprising a number of through holes disposed equidistantly at a concave surface on an external side of a rim, and a number of eyelets engaged into the through holes by a pressing machine for anchoring and coupling the spokes to the wheel rim.

However, a pressing machine is further required to be provided to engage with the eyelets and to press or force the eyelets into the through holes such that the spokes may not be easily and quickly or readily attached or coupled to the wheel rim by the users themselves.

The present invention has arisen to mitigate and/or obviate the afore-described disadvantages of the conventional spoke fastening devices.

SUMMARY OF THE INVENTION

The primary objective of the present invention is to provide a spoke fastening device for a vehicle wheel, such as a wheel for a bicycle, unicycle, tricycle, motorcycle or the like, and including a structure for being easily installed to or disengaged from the vehicle wheel by the users themselves.

The other objective of the present invention is to provide a spoke fastening device for the vehicle wheel including a weight reduced structure.

In accordance with one aspect of the invention, there is provided a spoke fastening device comprising a wheel rim including a spoke bed, and a spoke fastening hole drilled through the spoke bed and bounded by a peripheral flange, a nipple including a head, and a stem extended from the head and having an outer diameter smaller than an outer diameter of the head, both the head and the stem being engageable through the spoke fastening hole of the spoke bed of the wheel rim, the nipple including a threaded hole formed therein, a ferrule including a collar engaged onto the nipple, and the collar including an inner peripheral wall and an outer peripheral wall each having a lower portion for engaging through and into the spoke fastening hole of the spoke bed, the inner peripheral wall of the collar including a first outwardly curved rim for engaging with the spoke bed of the wheel rim and for anchoring the ferrule to the spoke bed of the wheel rim, and the outer peripheral wall of the collar including a second outwardly curved rim for engaging with the first curved rim of the inner peripheral wall, the head of the nipple being engageable with the lower portion of the inner peripheral wall for flaring and deforming the lower portions of the inner and the outer peripheral walls and for forcing the lower portion of the outer peripheral wall to engage with the spoke bed of the wheel rim, and a spoke including a threaded portion engaged with the threaded hole of the nipple for forcing the head of the nipple to engage with and to flare the lower portions of the inner and the outer peripheral walls and to engage with the spoke bed of the wheel rim.

The lower portions of the inner and the outer peripheral walls of the collar are preferably folded relative to each other, and the inner and the outer peripheral walls of the collar are preferably folded or bent from a cylindrical member or the like.

The second outwardly curved rim of the outer peripheral wall of the collar preferably includes a circular cross section. It is preferable that the second outwardly curved rim of the outer peripheral wall of the collar is extended outwardly relative to the first curved rim of the inner peripheral wall.

The inner peripheral wall of the collar is preferably inclined relative to the outer peripheral wall of the collar. The ferrule includes at least one slot longitudinally formed in the lower portions of the inner and the outer peripheral walls of the collar for forming at least one blade in the collar.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a plan schematic view illustrating a spoke fastening device in accordance with the present invention for attaching or coupling the spokes to the wheel rim of a vehicle wheel, such as a wheel for a bicycle, unicycle, tricycle, motorcycle or the like;

FIGS. 9, 10, 11, 12 are partial cross sectional views similar to FIGS. 4-7, illustrating the other arrangement or application of the spoke fastening device.

DETAILED DESCRIPTION OF THE PREFERRED EMBODIMENT

Figure 1:
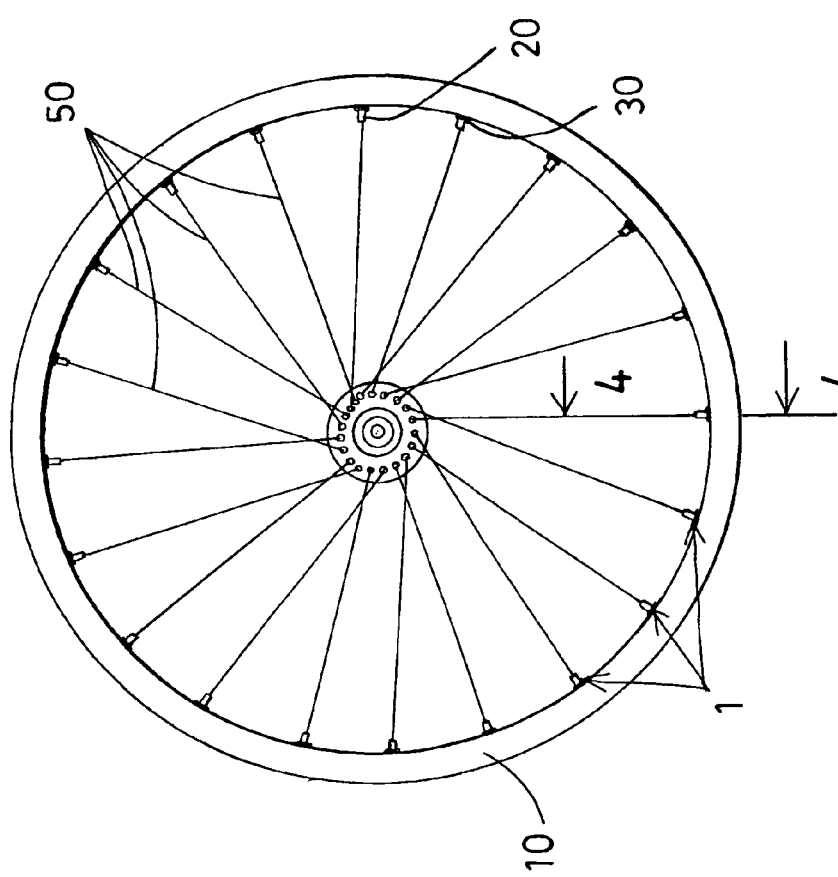
Figures 2, 3:
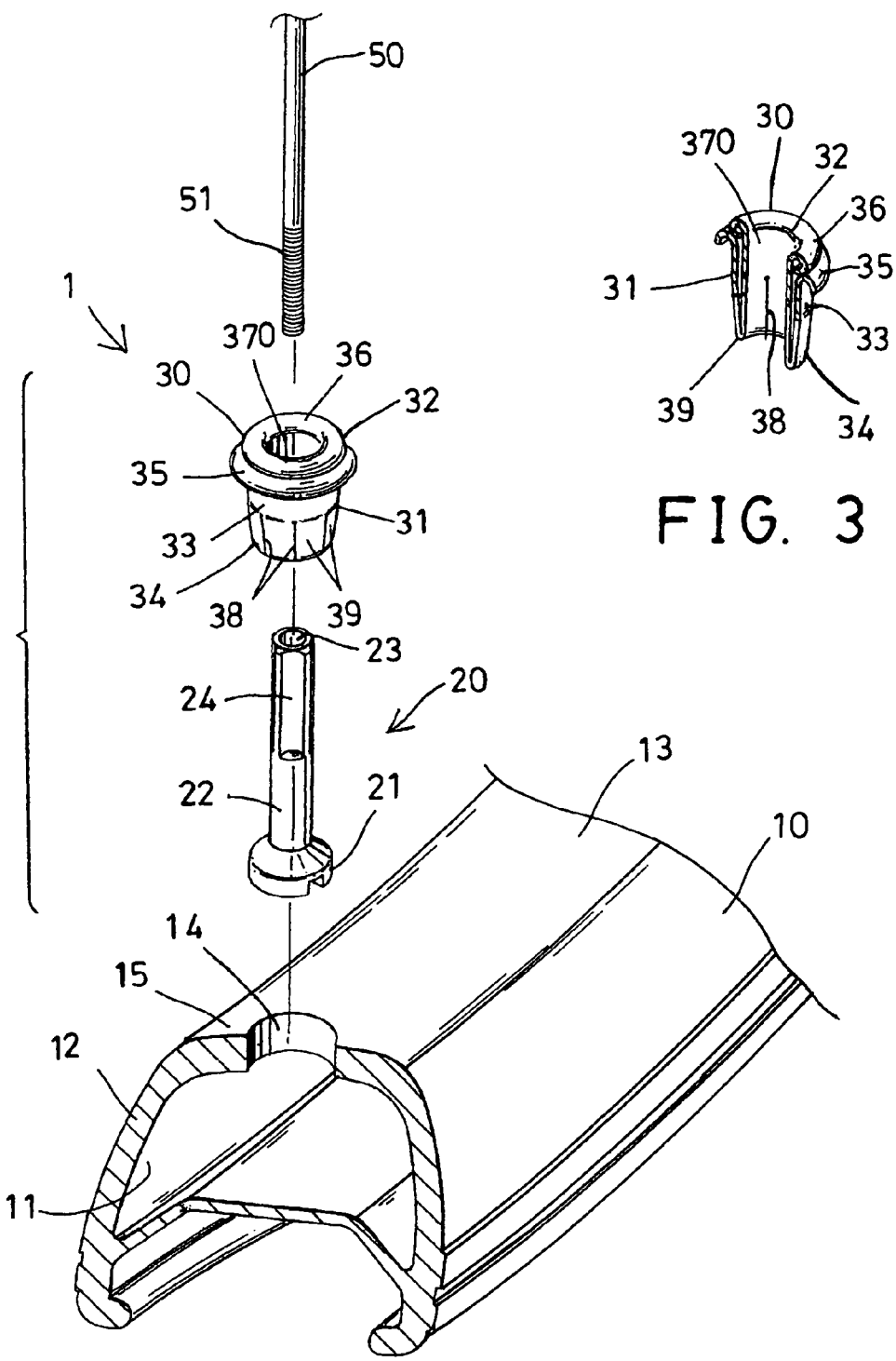
FIG. 2 is a partial exploded view of the spoke fastening device for the vehicle wheel.
FIG. 3 is a partial perspective view of the spoke fastening device in which one half of the spoke fastening device has been cut off for showing an inner structure of the spoke fastening device.

Referring to the drawings, and initially to FIGS. 1-4, a spoke fastening assembly or device 1 in accordance with the present invention comprises a wheel rim 10 for a vehicle wheel, such as a wheel for a bicycle, unicycle, tricycle, motorcycle or the like, and the wheel rim 10 includes a "double-wall" construction having an enclosed cavity 11 formed therein and bounded by the sidewalls 12 and a spoke bed 13, and a number of orifices or spoke fastening holes 14 drilled through the spoke bed 13 and formed or defined and bounded by the peripheral flanges 15, it is preferable that the spoke fastening holes 14 of the spoke bed 13 of the wheel rim 10 are equally spaced from each other and are sized to accept the head 21 of the nipple 20 and the collar 31 of the ferrule 30 for easily and quickly or readily attaching or securing or coupling the spokes 50 to the wheel rim 10, in which the collar 31 of the ferrule 30 is engaged onto a stem 22 that is extended upwardly from the head 21 of the nipple 20.

The stem 22 includes an outer diameter smaller than the outer diameter of the head 21, and both the head 21 and the stem 22 of the nipple 20 are to be engaged through the spoke fastening holes 14 of the spoke bed 13 of the wheel rim 10, and the stem 22 includes a threaded hole or screw hole 23 formed therein (FIG. 2) and extended through the center of the nipple 20 to accept or to engage with the threaded portion 51 of the spoke 50 when the complete wheel is assembled (FIG. 1). The head 21 includes an outer diameter equal to or slightly smaller than the inner diameter of the spoke fastening holes 14 of the spoke bed 13 of the wheel rim 10. The stem 22 further includes one or more cut-off portions or flat surfaces 24 formed in the outer portion thereof to mate with a spoke nipple wrench (not shown) so that the nipple 20 may be manually turned in the conventional manner to adjust its threaded assembly with the spoke 50.

The collars 31 of the ferrules 30 each include an inner peripheral wall or cylindrical wall 32 and an outer peripheral wall or cylindrical wall 33 substantially parallel to each other and having a lower portion 34 formed or folded or coupled together at a folded coupling portion 34; i.e., the inner and the outer peripheral walls 32, 33 are folded relative to each other and may be bent or folded, for example, from a cylindrical member (not shown). The outer peripheral wall 33 includes an outwardly folded and curved or rounded rim 35 formed in the outer portion of one end or upper end portion thereof for engaging with the peripheral flange 15 of the spoke bed 13 of the wheel rim 10 and for anchoring or positioning or securing or mounting the ferrules 30 to the spoke bed 13 of the wheel rim 10.

It is preferable that the outer peripheral wall 33 of the ferrule 30 includes an outer diameter equal to or slightly smaller than the inner diameter of the spoke fastening holes 14 of the spoke bed 13 of the wheel rim 10 for snugly fitting the outer peripheral wall 33 of the ferrule 30 in the respective spoke fastening holes 14 of the spoke bed 13 of the wheel rim 10, best shown in FIGS. 4-7, and the inner peripheral wall 32 of the ferrule 30 also includes an outwardly folded and curved or rounded rim 36 formed in the outer portion of one end or upper end portion thereof and having a circular cross section (FIGS. 4-7) for contacting or engaging with the curved rim 35 of the outer peripheral wall 33 of the ferrule 30 and for resiliently fitting or anchoring or positioning or securing or mounting the stem 22 of the nipple 20 in the respective spoke fastening holes 14 of the spoke bed 13 of the wheel rim 10 and for allowing the inner peripheral wall 32 of the ferrule 30 to be selectively tilted or inclined relative to the outer peripheral wall 33 of the ferrule 30 and to be formed with the tilted or inclined portion or surface 37 (FIG. 6) and thus for allowing the stem 22 of the nipple 20 to be suitably or slightly tilted or inclined relative to the inner peripheral wall 32 of the ferrule 30.

It is further preferable that the ferrule 30 includes an inner peripheral bore or chamber 370 formed in the inner peripheral wall 32 thereof and having an inner diameter equal to or slightly greater than the outer diameter of the stem 22 of the nipple 20 for snugly fitting the stem 22 of the nipple 20 in the chamber 370 of the inner peripheral wall 32 of the ferrule 30, and it is further preferable that the curved rim 36 of the inner peripheral wall 32 of the ferrule 30 is extended further upwardly or outwardly relative to the curved rim 35 of the outer peripheral wall 33 of the ferrule 30, or the curved rim 36 of the inner peripheral wall 32 of the ferrule 30 is extended out of the outer peripheral wall 33 of the ferrule 30 for suitably or selectively engaging with the curved rim 35 of the outer peripheral wall 33 of the ferrule 30, also best shown in FIGS. 4-7.

Figure 4:
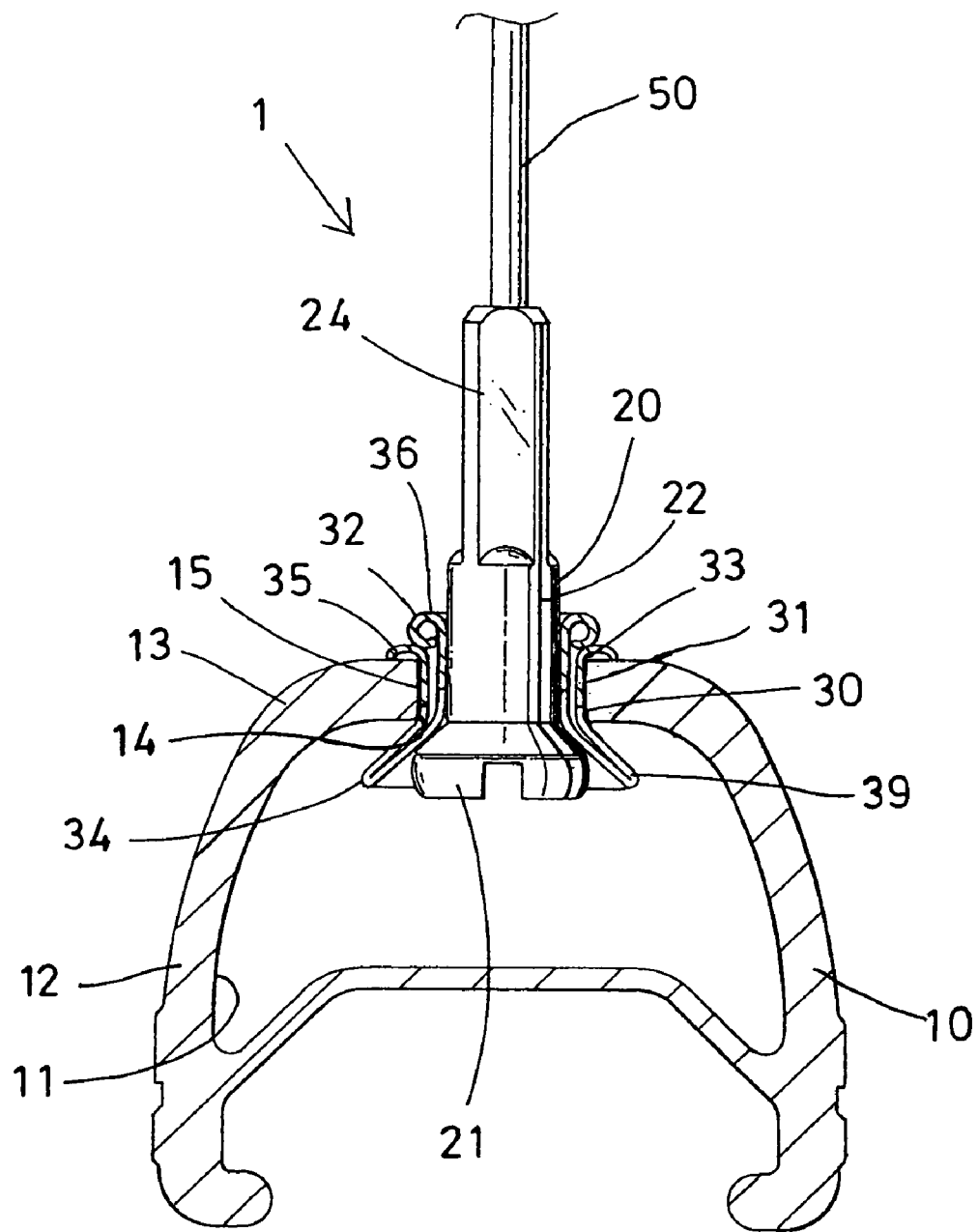
FIG. 4 is a partial cross sectional view of the spoke fastening device taken along lines 4-4 of FIG. 1.
Figure 6:
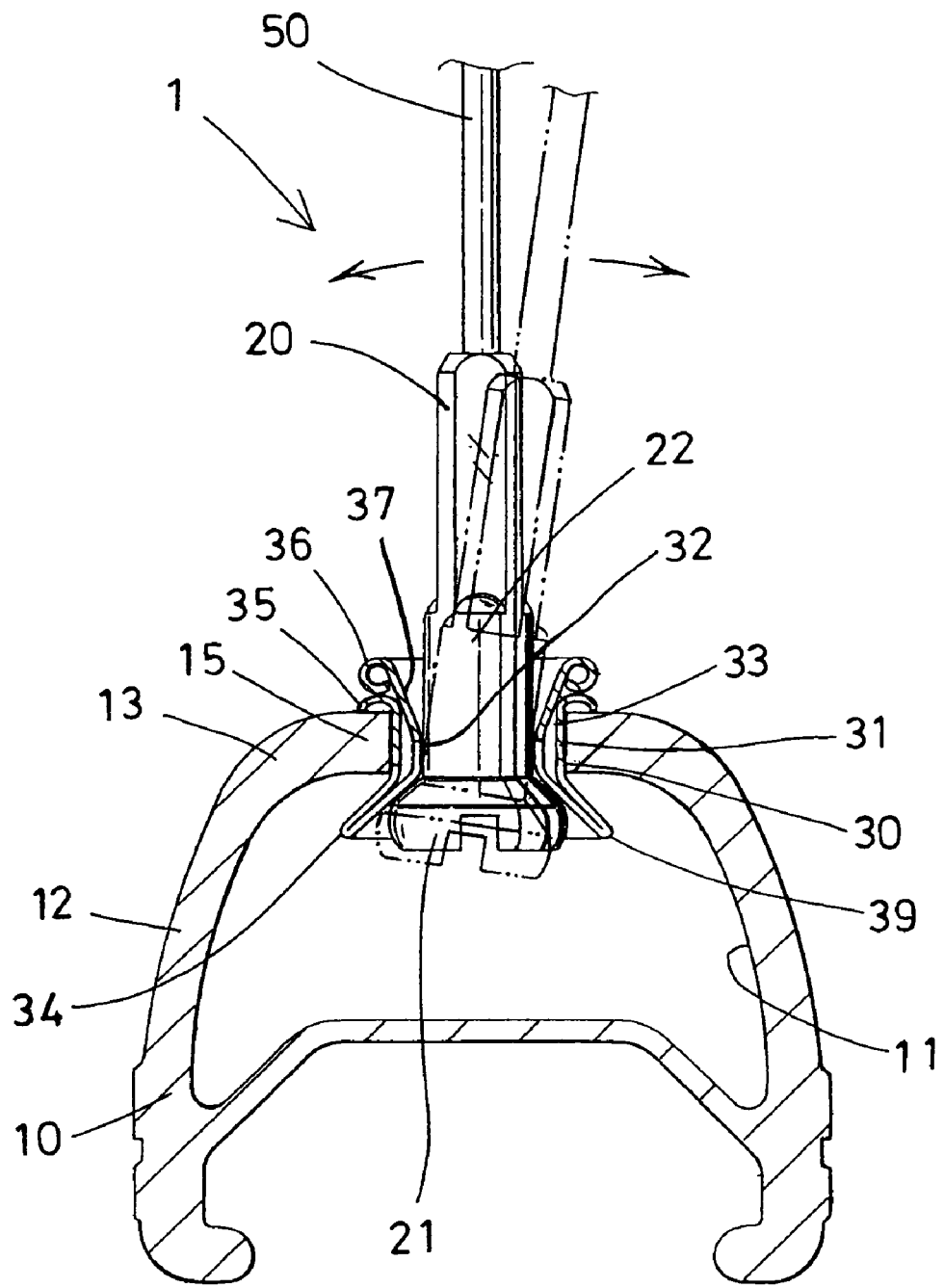

The collars 31 of the ferrules 30 each include one or more slots 38 longitudinally formed therein and preferably formed in the lower portions 34 of the inner and the outer peripheral walls 32, 33 for forming or defining one or more blades 39 (FIGS. 2, 3), it is preferable that the slots 38 and the blades 39 are equally spaced from each other, and the formation and the provision of the slots 38 in the collar 31 of the ferrule 30 allow the blades 39 to be easily flared or deformed or expanded or folded radially and outwardly by or with the head 21 of the nipple 20 (FIG. 4) when the head 21 of the nipple 20 is pulled or forced toward the lower portions 34 of the inner and the outer peripheral walls 32, 33, in order to stably anchor or position or secure the ferrules 30 to the spoke bed 13 of the wheel rim 10 with the curved rim 35 of the outer peripheral wall 33 and the bent lower portions 34 of the inner and the outer peripheral walls 32, 33 (FIGS. 4, 6).

Figure 5:
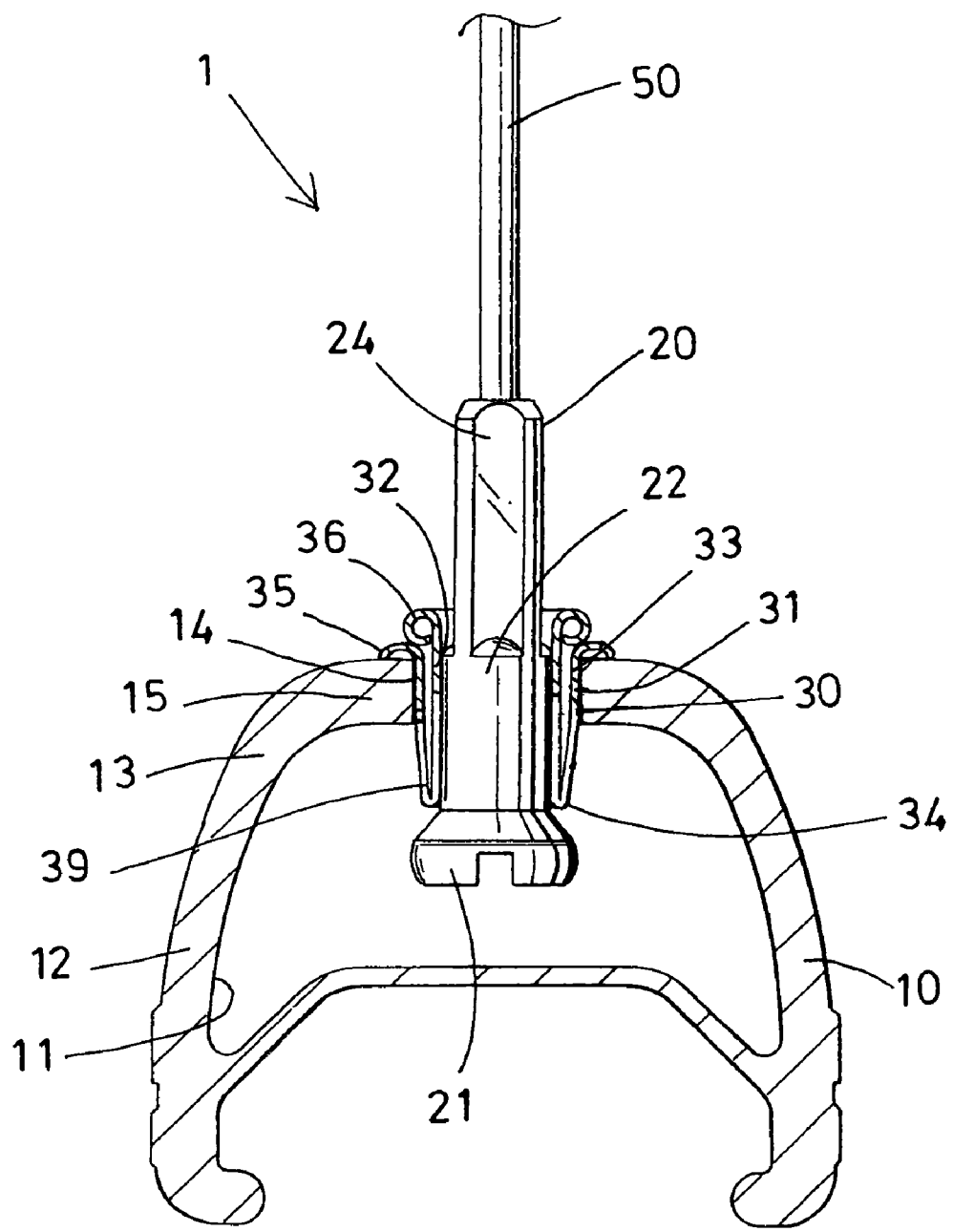
FIGS. 5, 6, 7 are partial cross sectional views similar to FIG. 4, illustrating the operation of the spoke fastening device.
Figure 8:
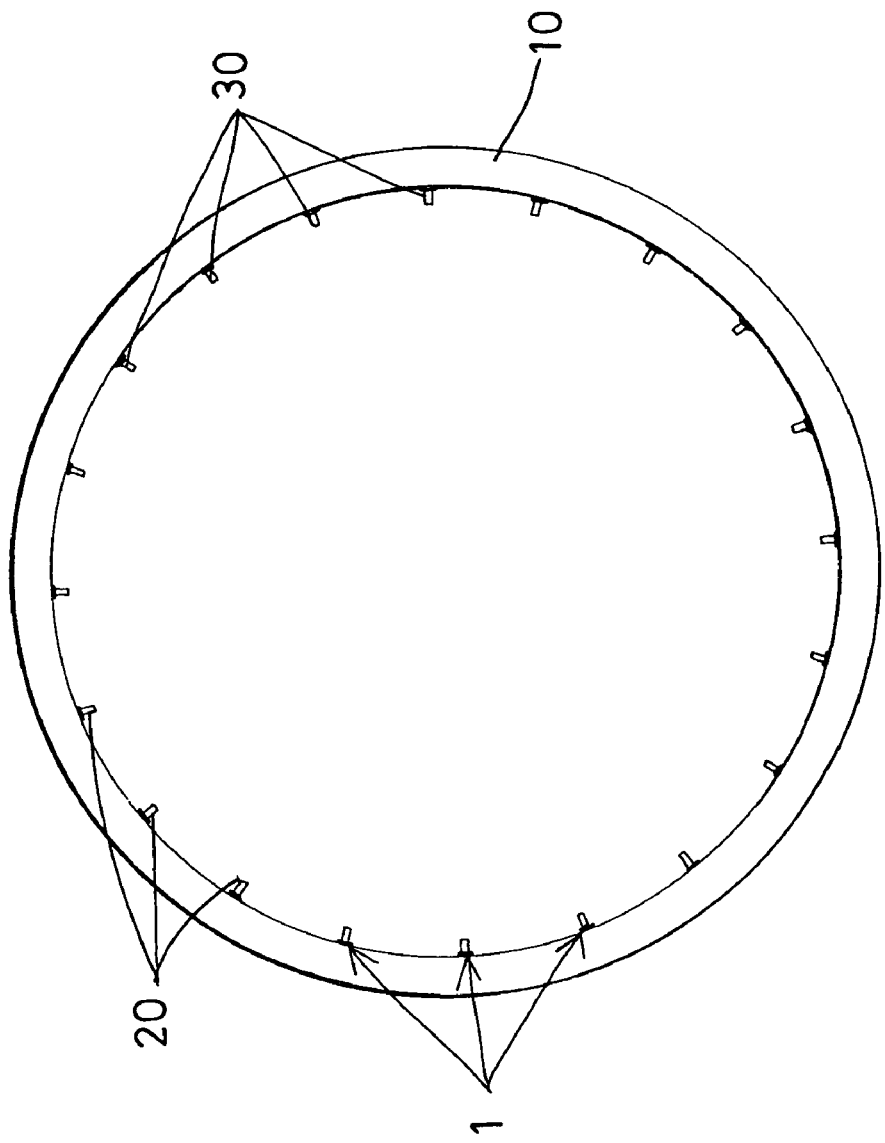
FIG. 8 is a plan schematic view similar to FIG. 1, illustrating the operation of the spoke fastening device.

In operation or in assembling the spoke fastening device 1 in accordance with the present invention to the wheel rim 10, as shown in FIG. 5, the head 21 of the nipple 20 and the collar 31 of the ferrule 30 may be engaged through the spoke fastening hole 14 of the spoke bed 13 until the curved rim 35 of the outer peripheral wall 33 is engaged with the spoke bed 13 of the wheel rim 10. As shown in FIG. 6, the head 21 of the nipple 20 may then be pulled or forced toward the spoke bed 13 by or with the spoke 50 in order to flare or deform the lower portions 34 of the inner and the outer peripheral walls 32, 33 and to engage with the peripheral flange 15 of the spoke bed 13, and to secure the nipple 20 and the ferrules 30 to the spoke bed 13. As shown in FIG. 8, the spokes 50 may then be removed from the nipples 20 and the wheel rim 10 for allowing the wheel rim 10 to be easily and readily attached or mounted or secured to the wheeled vehicles.

Figure 7:
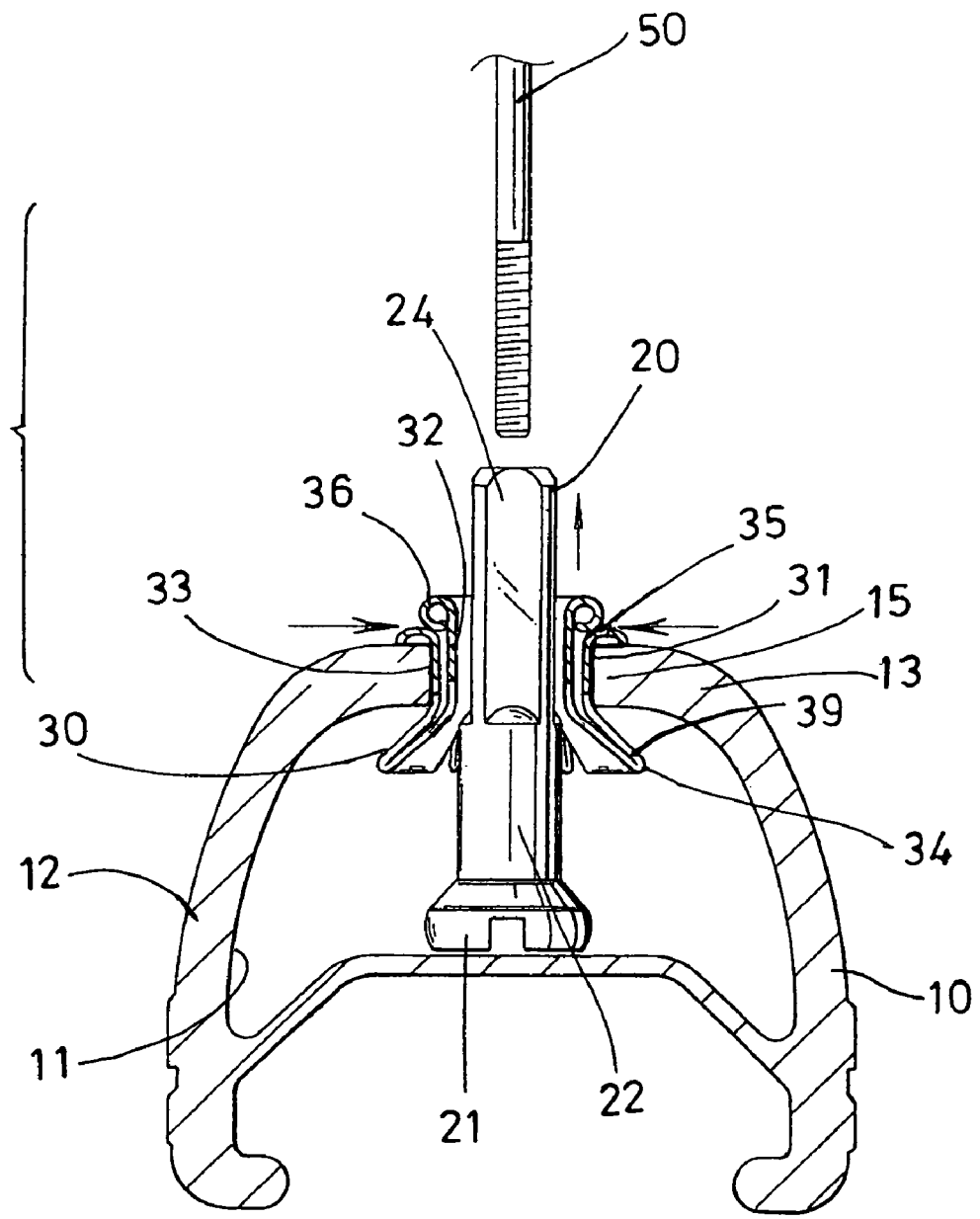

As shown in FIG. 6, the stem 22 of the nipple 20 is allowed to be slightly tilted or inclined relative to the ferrule 30 and/or the spoke bed 13 of the wheel rim 10, and the curved rim 36 of the inner peripheral wall 32 of the ferrule 30 may still be suitably engaged with the curved rim 35 of the outer peripheral wall 33 for making a suitably seal between the nipples 20 and the ferrules 30 and/or the spoke bed 13 of the wheel rim 10. As shown in FIG. 7, after or when the ferrules 30 and/or the nipples 20 and/or the spokes 50 are required to be changed with the new ones, or are required to be disengaged from the spoke bed 13 of the wheel rim 10, the head 21 of the nipple 20 may first be disengaged from the bent lower portion 34 of the inner peripheral wall 32, and the curved rim 36 of the inner peripheral wall 32 may then be pulled away from the spoke bed 13 of the wheel rim 10 in order to pull the inner peripheral wall 32 and then the outer peripheral wall 33 away from the spoke bed 13 of the wheel rim 10 in sequence, and thus to allow the collar 31 of the ferrule 30 to be easily disengaged from the spoke fastening holes 14 of the spoke bed 13 when required.

Figure 13:
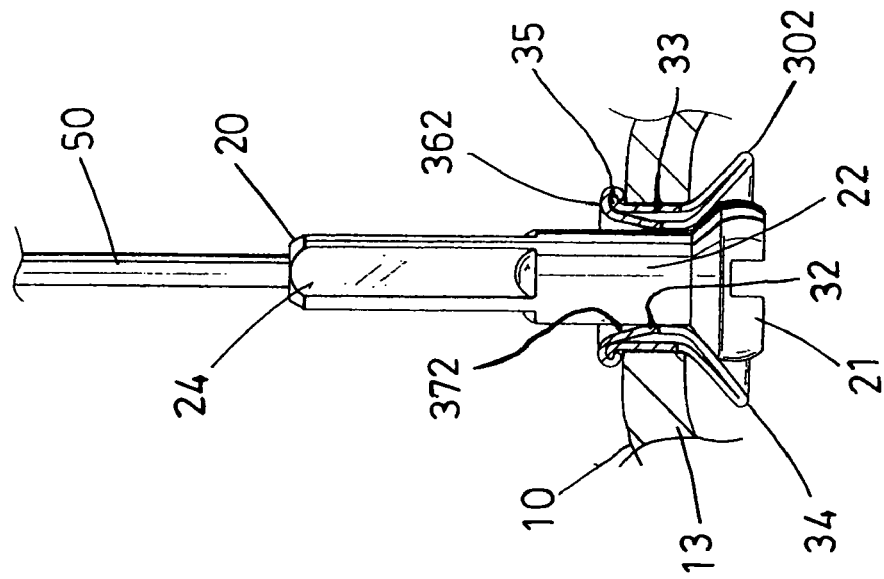
FIGS. 13, 14 are further partial cross sectional views similar to FIGS. 9-10, illustrating the further arrangement or application of the spoke fastening device.
Figure 14:
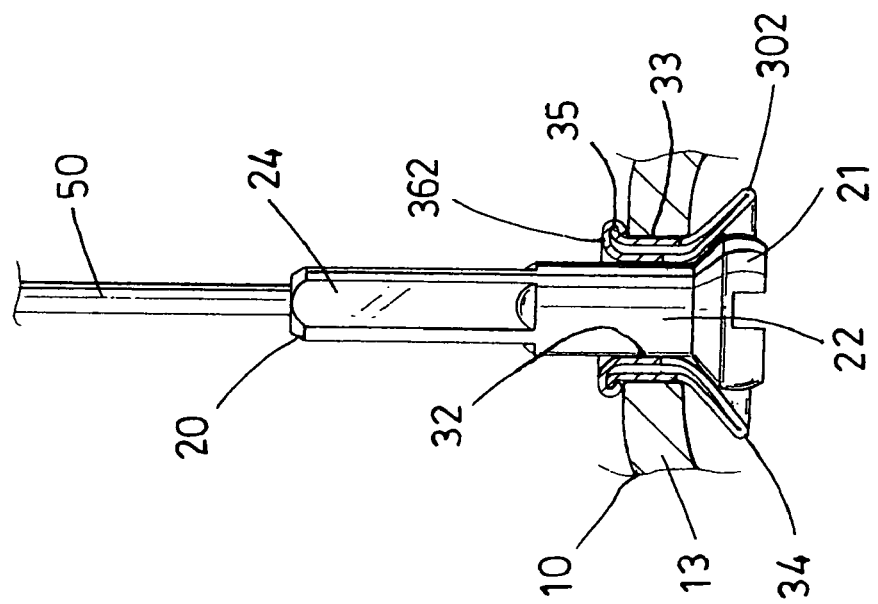

Alternatively, as shown in FIGS. 9-12, the curved rim 361 of the inner peripheral wall 32 of the ferrule 301 includes only a curved structure for engaging with the curved rim 35 of the outer peripheral wall 33 and for making the suitable seal between the nipples 20 and the ferrules 301 and/or the spoke bed 13 of the wheel rim 10, the inner peripheral wall 32 of the ferrule 301 may also be selectively formed with the tilted or inclined portion or surface 371 (FIGS. 10, 12) for allowing the stem 22 of the nipple 20 to be suitably or slightly tilted or inclined relative to the inner peripheral wall 32 of the ferrule 301. Further alternatively, as shown in FIGS. 13-14, the curved rim 362 of the inner peripheral wall 32 of the ferrule 302 may be suitably or slightly curved for engaging with or for covering or gripping or holding the curved rim 35 of the outer peripheral wall 33 and for making the suitably seal between the nipples 20 and the ferrules 302 and/or the spoke bed 13 of the wheel rim 10.

Accordingly, the spoke fastening device in accordance with the present invention may be provided for a vehicle wheel, such as a wheel for a bicycle, unicycle, tricycle, motorcycle or the like, and includes a structure for being easily installed to or disengaged from the vehicle wheel by the users themselves, and including a weight reduced structure.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spoke fastening device comprising:
    a wheel rim including a spoke bed, and a spoke fastening hole drilled through said spoke bed and bounded by a peripheral flange,
    a nipple including a head, and a stem extended from said head and having an outer diameter smaller than an outer diameter of said head, both said head and said stem being engageable through said spoke fastening hole of said spoke bed of said wheel rim, said nipple including a threaded hole formed therein,
    a ferrule including a collar engaged onto said nipple, and said collar including an inner peripheral wall and an outer peripheral wall each having a lower portion for engaging through and into said spoke fastening hole of said spoke bed, said inner peripheral wall of said collar including a first outwardly curved rim for engaging with said spoke bed of said wheel rim and for anchoring said ferrule to said spoke bed of said wheel rim, and said outer peripheral wall of said collar including a second outwardly curved rim for engaging with said first curved rim of said inner peripheral wall, said head of said nipple being engageable with said lower portion of said inner peripheral wall for flaring and deforming said lower portions of said inner and said outer peripheral walls and for forcing said lower portion of said outer peripheral wall to engage with said spoke bed of said wheel rim, and
    a spoke including a threaded portion engaged with said threaded hole of said nipple for forcing said head of said nipple to engage with and to flare said lower portions of said inner and said outer peripheral walls and to engage with said spoke bed of said wheel rim.

2. The spoke fastening device as claimed in claim 1, wherein said lower portions of said inner and said outer peripheral walls are folded relative to each other.

3. The spoke fastening device as claimed in claim 1, wherein said second outwardly curved rim of said outer peripheral wall of said collar includes a circular cross section.

4. The spoke fastening device as claimed in claim 1, wherein said second outwardly curved rim of said outer peripheral wall of said collar is extended outwardly relative to said first curved rim of said inner peripheral wall.

5. The spoke fastening device as claimed in claim 1, wherein said inner peripheral wall of said collar is inclined relative to said outer peripheral wall of said collar.

6. The spoke fastening device as claimed in claim 1, wherein said ferrule includes at least one slot longitudinally formed in said lower portions of said inner and said outer peripheral walls of said collar for forming at least one blade in said collar.

* * * * *